UNITED STATES PATENT OFFICE.

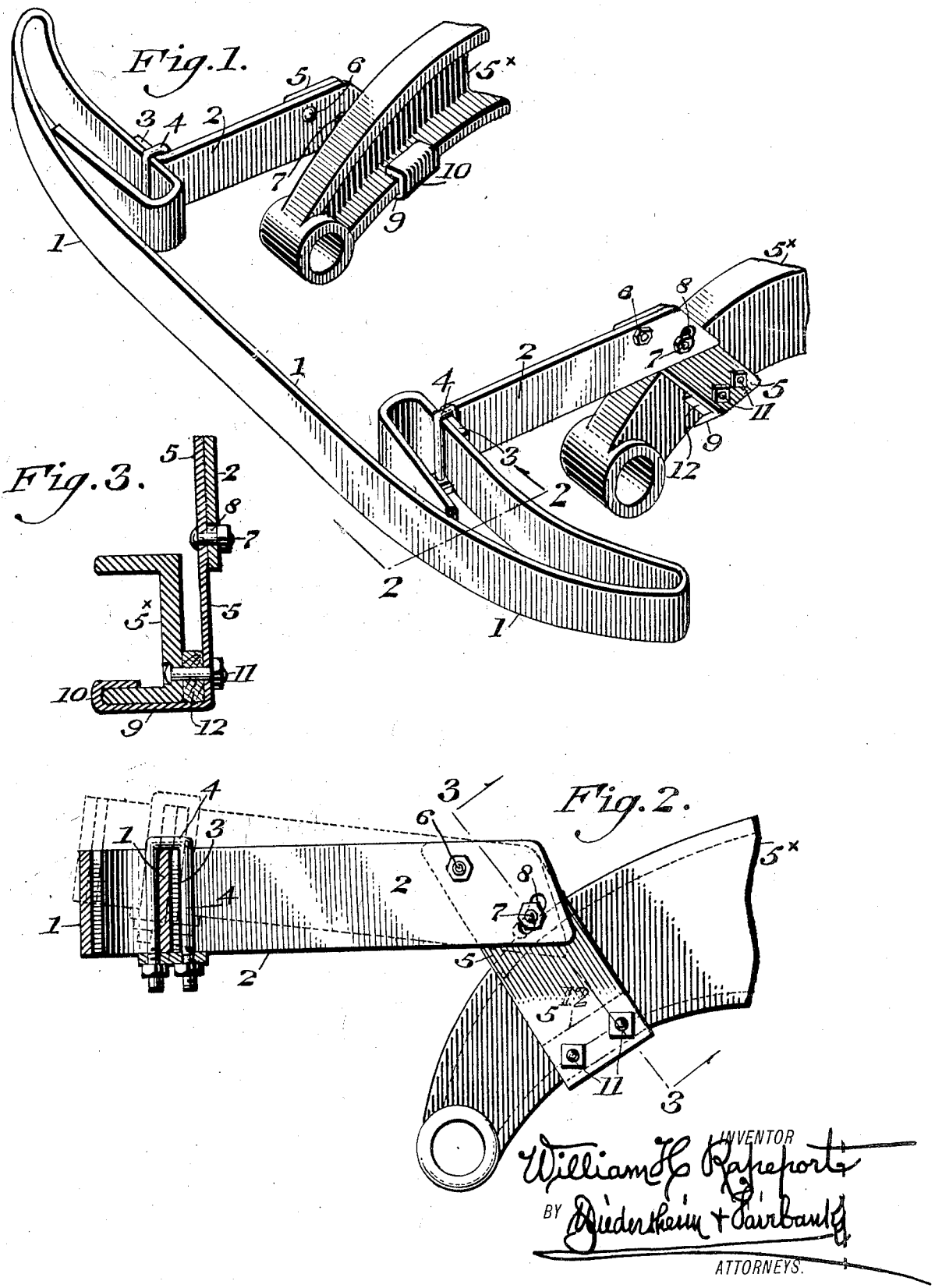

WILLIAM H. RAPEPORT, OF PHILADELPHIA, PENNSYLVANIA.

AUTOMOBILE FENDER ATTACHMENT.

1,316,853.　　　　Specification of Letters Patent.　　Patented Sept. 23, 1919.

Application filed July 5, 1919.　Serial No. 308,745.

*To all whom it may concern:*

Be it known that I, WILLIAM H. RAPEPORT, a citizen of the United States, residing in the city and county of Philadelphia, State of Pennsylvania, have invented a new and useful Automobile Fender Attachment, of which the following is a specification.

My invention relates to an improvement in means for attaching and supporting a fender or buffer of an auto vehicle, and consists of bracket members adapted for such attachment and support, and the adjustment of the height of the fender.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a perspective view of an attachment and support for a fender or buffer of an auto vehicle.

Fig. 2 represents a side elevation thereof, partially sectional on line 2—2 Fig. 1.

Fig. 3 represents a transverse section of a portion on line 3—3 of Fig. 2.

Similar numerals of reference indicate corresponding parts in the figures.

Referring to the drawings, 1 designates a fender or buffer which is of a type shown in Letters Patent 1,247,442, granted to Bernard Nichols, on the 20th day of November, 1917.

2 designates arms which extend rearward from said fender and are formed at their front ends with the laterally extending limbs 3 with which the rear members of said fender are connected by the clevises 4 which are adapted to embrace said members and limbs and are held firmly thereon by suitable nuts on the lower terminals of said clevises.

5 designates brackets which are secured to the sides of the members $5^x$ of the chassis of an auto-vehicle and rise therefrom and have the rear ends of the arms 2 connected therewith by the bolts 6 and 7, the bolts 6 passing through said arms 2 and brackets 5 forming pivots for the arms 2 whereby the latter and consequently the fender may be raised and lowered so as to adjust the fender in height that may be desired.

The bolts 7 pass through segmental elongated slots 8 in the arms 2, and openings in the brackets 5, said slots permitting rotational motions of the arms 2 for the purpose of adjusting the height of the latter according to the requirements of adjustment of the fender.

The bolts 6 and 7 are provided with nuts whereby when the aforesaid adjustment is accomplished and said nuts are tightened the arms 2 are firmly held in position on the brackets.

The lower ends of the brackets have thereon the inwardly extending limbs 9 which form elbows, with said ends of the brackets at the lower outside corners of the members $5^x$ of the chassis, said limbs 9 being seated against the undersides of said members $5^x$ and their inner ends formed with hook-like devices 10 which embrace the inner sides of the lower portions of the members $5^x$.

Bolts 11 are passed through the lower portions of the brackets 5 and the bodies of the members $5^x$, see Fig. 3, said bolts being provided with suitable nuts which when tightened cause the brackets and their appurtenances to be clamped firmly to said members $5^x$ and so sustaining the brackets on the latter in a rigid and reliable manner and correspondingly sustaining the fender.

In order to increase the hold of the brackets on said members, washers 12 are interposed between lower portions of the members and brackets, and have the bolts 11 passed through the same, the tightening of the nuts on said bolts causing the compression of said washers and increasing the frictional contact of the brackets and the members $5^x$ with said washers.

Having thus described my invention what I claim as new and desire to secure by Letters Patent, is:—

1. In a fender attachment of the character stated, an arm adapted to sustain said fender or buffer, and a bracket adapted to carry said arm, said bracket having on an end a horizontally-extending limb forming an elbow therewith, and a hook-like device on its terminal, and means for tightening said bracket, elbow and device in position.

2. In a fender attachment of the character stated, an arm adapted to sustain said fender or buffer, and a bracket adapted to carry said arm, said bracket having on an end a horizontally-extending limb forming an elbow therewith, and a hook-like device on its terminal, and means for tightening said bracket, elbow and device in position, said arm being connected with said bracket by a pivotal bolt and provided with a segmental slot, and a tightening bolt which is passed through said slot into said arm, said bolts having nuts thereon.

3. In a fender attachment for a vehicle of the character stated, an arm adapted to be connected with said fender, a bracket on which said arm is pivotally mounted, a tightening bolt passing through said bracket and arm, the latter having therein a segmental slot which is adapted to receive said bolt, means for tightening said bolt, said bracket having on an end a horizontally-extending limb forming an elbow therewith adapted to embrace the underside of a member of the vehicle, and said limb having on its terminal a hook-like device adapted to clamp the inner side of said member, and means for tightening said bracket, elbow and hook-like device on said member.

WILLIAM H. RAPEPORT.

Witnesses:
JOHN A. WEIDERSHEIM,
N. BUSSINGER.